(Model.)

T. M. FLENNIKEN & T. W. GRAHAM.
T. M. FLENNIKEN, dec'd., W. McGREGOR, administrator.
WATER WHEEL.

No. 293,238. Patented Feb. 12, 1884.

(Model.) 5 Sheets—Sheet 4.

T. M. FLENNIKEN & T. W. GRAHAM.
T. M. FLENNIKEN, dec'd., W. McGREGOR, administrator.
WATER WHEEL.

No. 293,238. Patented Feb. 12, 1884.

Witnesses.
Mrs. Lallah Connor.
A. D. Behel

Inventors.
Theodore M. Flenniken,
Thomas W. Graham.
Per Jacob Behel,
Atty.

(Model.) 5 Sheets—Sheet 5.
T. M. FLENNIKEN & T. W. GRAHAM.
T. M. FLENNIKEN, dec'd., W. McGREGOR, administrator.
WATER WHEEL.
No. 293,238. Patented Feb. 12, 1884.

UNITED STATES PATENT OFFICE.

THEODORE M. FLENNIKEN, OF ROCKFORD, ILLINOIS, AND THOMAS W. GRAHAM, OF DUBUQUE, IOWA; WILLIAM McGREGOR ADMINISTRATOR OF THEODORE M. FLENNIKEN, DECEASED.

WATER-WHEEL.

SPECIFICATION forming part of Letters Patent No. 293,238, dated February 12, 1884.

Application filed January 16, 1882. (Model.)

*To all whom it may concern:*

Be it known that we, THEODORE M. FLENNIKEN and THOMAS W. GRAHAM, citizens of the United States, residing, respectively, in the city of Rockford, in the county of Winnebago and State of Illinois, and in the city of Dubuque, in the county of Dubuque and State of Iowa, have invented new and useful Improvements in Water-Wheels, of which the following is a specification.

Our invention relates to water-wheels of the turbine type, and of that class which receives the water at the periphery and discharges it downward; and the object of our invention is to increase the efficiency of this class of water-wheels; and it consists, mainly, in producing the buckets of a conformation to least disturb or break the column of water in its passage through the wheel, in a centrally-supported gate-controlling ring-spider, and in a lubricating tubular connection with the center of the step-support, and in the combinations of these several parts with other necessary parts employed in the construction of an operative wheel, which constitute the subject-matter of this specification.

Figure 1:
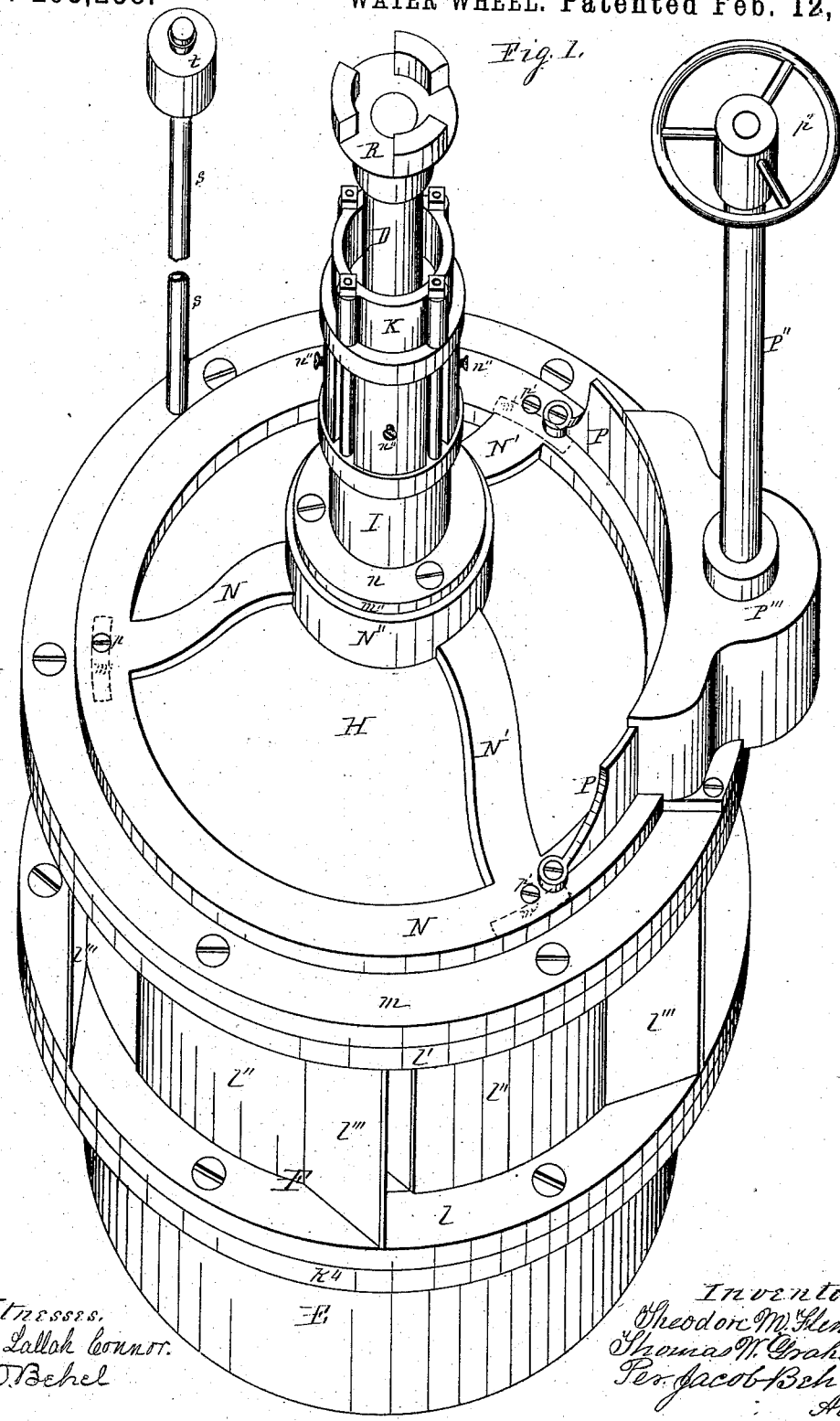
Figure 2:
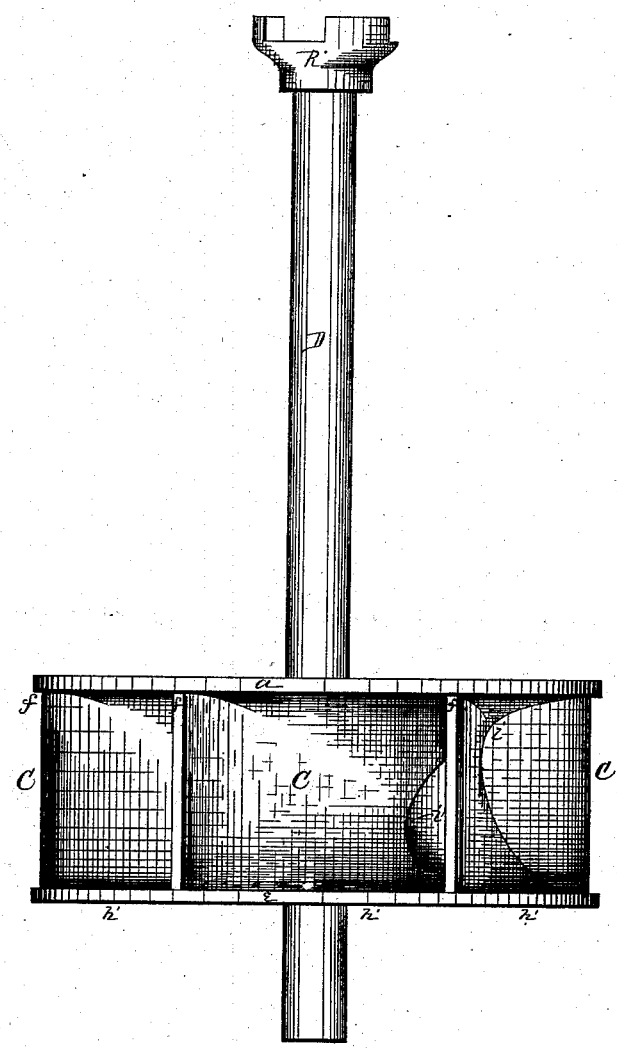
Figure 3:
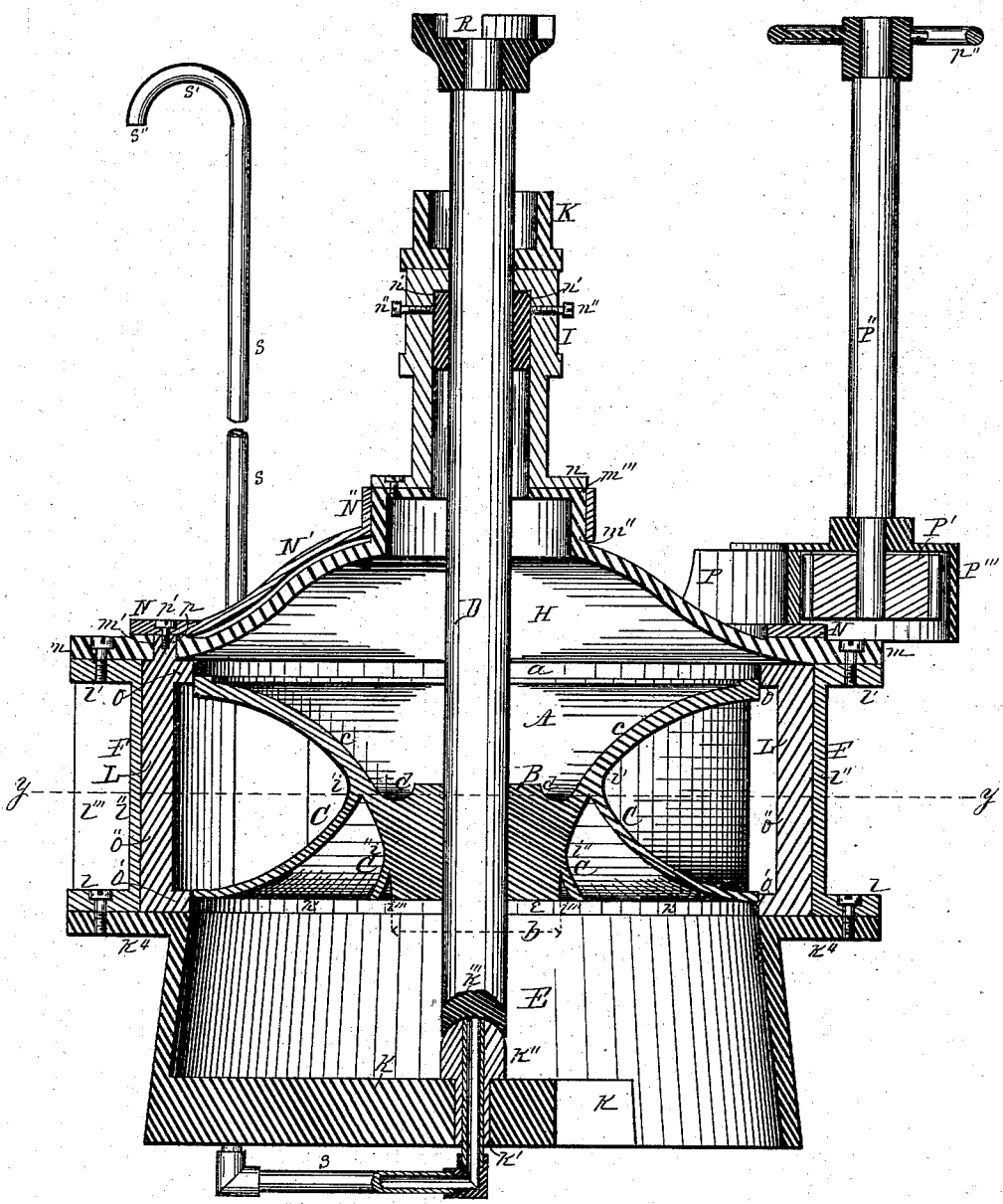
Figure 4:
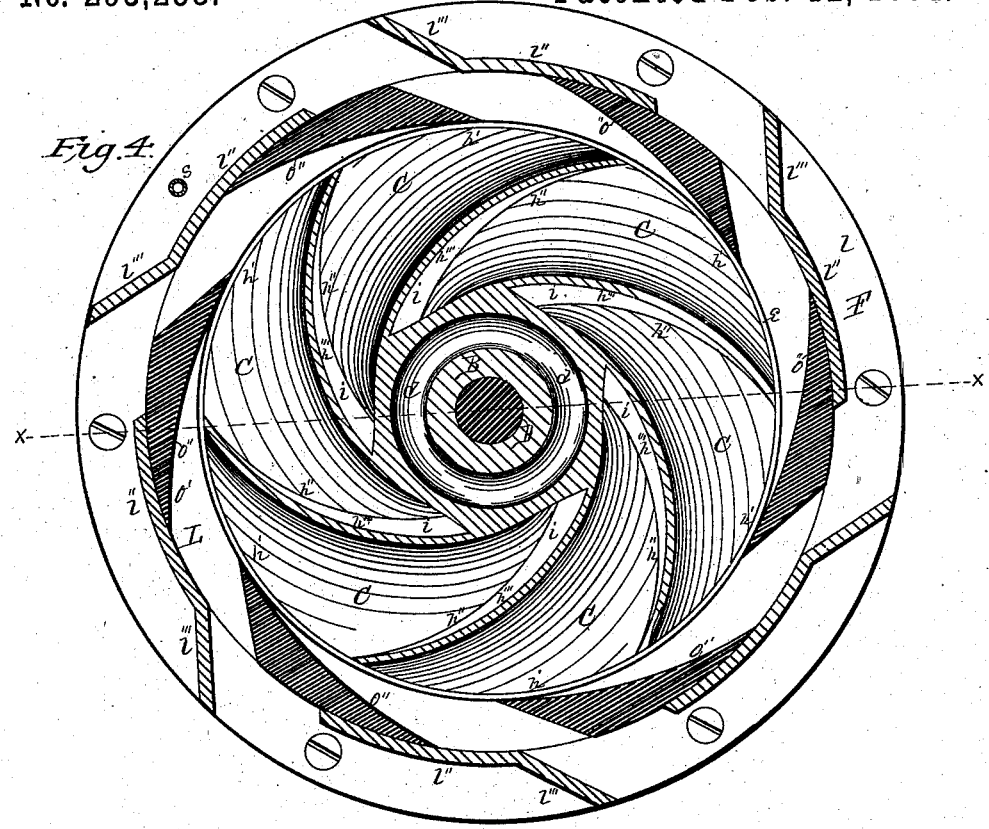
Figure 5:
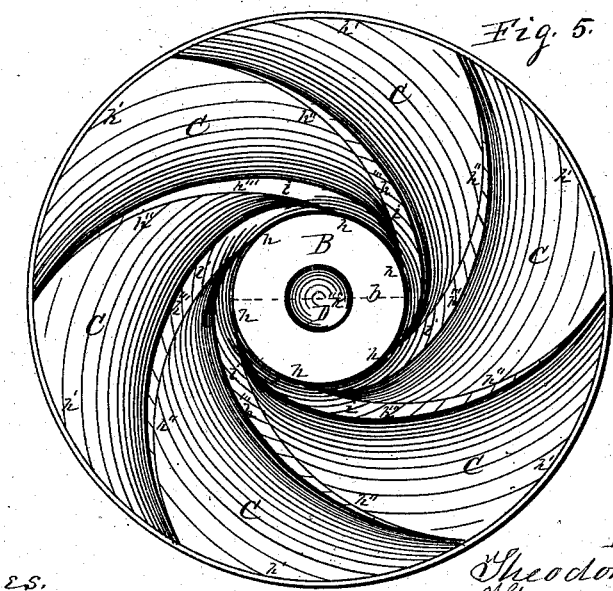
Figure 6:
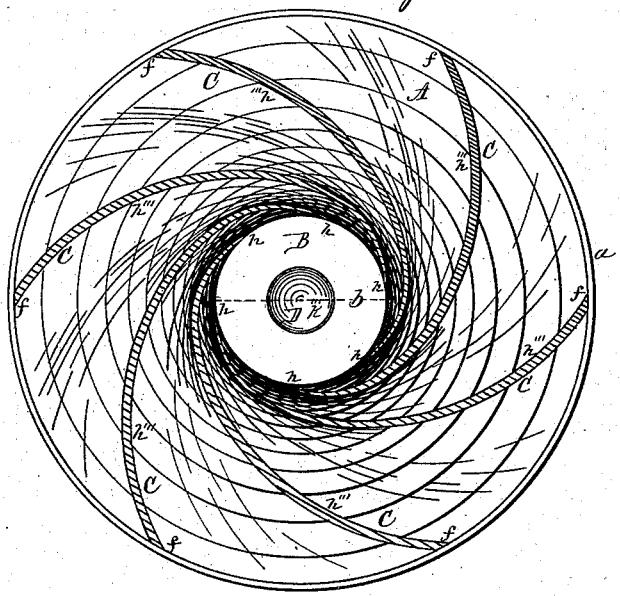
Figure 7:
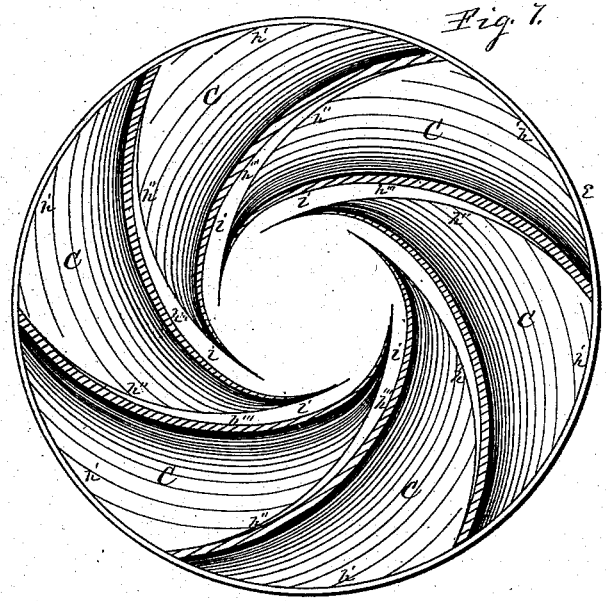

In the accompanying drawings, Figure 1 is an isometrical representation of a water-wheel embodying our invention. Fig. 2 is an elevation of the wheel removed from the case. Fig. 3 is a vertical central section on dotted line $x$ $x$, Fig. 4. Fig. 4 is a horizontal section on dotted line $y$, Fig. 3. Fig. 5 is an under face view of the wheel removed from the case. Fig. 6 is an under face view of the upper plate of the wheel, with the buckets cut therefrom on the spiral line of their connection therewith; and Fig. 7 is an upper face view of the buckets as cut from the upper plate, Fig. 6.

In the several figures, A represents the upper plate of the water-wheel, having a horizontal outer rim, $a$, from the outer under edge of which it curves downward and inward toward the center in a regular curve, which, if produced through the intersections of the buckets, would be substantially a quadrant or nearly the quadrant of a circle, and meeting the plane of the under face of the wheel in a circle having a diameter, $b$, equal to the lower end of the hub B of the wheel. The upper face of this upper plate, A, is of dishing form, having the upper surface of its side walls, $c$, convex, curving inward and downward, with its surface lines substantially parallel with the curve bounding its under surface, and meeting the hub of the wheel in a reverse curve, $d$, at or near the vertical center of the wheel.

At $e$ is represented the lower horizontal outer rim of the wheel, which is in the plane of its lower end, and is of the same diameter as the upper outer rim, $a$, both of which are concentric with the axial center of the wheel. This wheel is produced with a series of buckets, C, placed therein at proper equal intervals, and in such a manner that their outer ends shall connect the outer rims of the wheel in vertical lines, or in lines substantially parallel to the axis of the wheel. These buckets C from their point of contact with the outer upper rim of the wheel at $f$ have a descending outward curving form, having their connection with the under face of the upper plate of the wheel in a descending, slightly-curving spiral line, extending about half round the wheel, terminating in the plane of the lower face thereof, at the point $h$, on the peripery of the hub of the wheel. These buckets from their connection with the under surface of the upper plate and hub of the wheel curve downward and outward, having their outer edge form a portion of the under outer rim, substantially equal to the space between the contiguous buckets, as at $h'$, and their lower delivery end portions meet the plane of the under surface of the wheel in a convex curve, $h''$, springing from the point $h$ on the wheel-hub, at which the curving spiral meeting line of the buckets with the under side of the upper plate and hub of the wheel meets the plane of the under face thereof, and connects the under outer rim of the wheel at or about the point at which the outer vertical end of the adjacent bucket joins the rim. The curves of these buckets and their meeting points with the hub, outer rim, and plane of the under face of the wheel are such that their convex curved delivery-edge $h''$ does not quite extend to the vertical line of the rear curve, $h'''$, of the adjacent bucket, but leaves small vertical delivery-space $i$ between the buckets, which is produced by reason of the respective buckets meeting the hub at equal spaces or divisions thereon, and the inner and delivery curves of the respective buckets springing from substantially the same point on the hub, from which point they diverge to meet the outer rim at different points in equal divisions. The meeting of the slightly-curved spirally-inclined upper edges of these buckets, with the under surface of the upper plate and hub of the wheel is such as to pass from the right angle at their peripheral junction at $f$ to a smooth and easy curve, as at $i''$, in descending toward the plane of the under face of the wheel, until it vanishes in the hub in a vertical union, as at $i'''$. These parts constitute the wheel proper, and in this instance are produced in a casting in one piece, which construction we prefer; but it is evident that our improved wheel may be produced mainly from plate material, having the parts suitably joined and securely fixed to each other by rivets, bolts, or in any other proper and convenient manner. The hub of this wheel is centrally bored to receive the shaft D, on which it is mounted, and is securely fixed in position thereon, and the periphery of the upper rim, $a$, and the lower rim, $e$, of the wheel is turned, presenting a smooth and true peripheral surface concentric to the axis of the shaft.

At E is represented the depending cylinder, having its lower end provided with a tri-armed spider, $k$, provided at the meeting center of the arms with an axial bore, $k'$, into which is fixed the step $k''$, having its upper end of semi-spherical form, adapted to receive the concave lower end, $k'''$, of the shaft D, to support the wheel centrally over the upper end of the cylinder. This cylinder is provided on its upper edge with an outward-projecting flange-like rim, $k^4$, the upper face of which is turned or otherwise produced in a true horizontal plane.

At F is represented the outer casing of the wheel, which is composed of a lower annular ring, $l$, and a like upper annular ring, $l'$, joined on their inner curved edges at proper equal intervals by curved vertical segments $l''$ and outward-flaring arms $l'''$, which join the end portion of the curved segments $l''$, and extend to the periphery of the annular rings. These curved segments $l''$ and their outward-flaring arms $l'''$ are in number equal to the number of buckets in the wheel, and their height is such that in connection with the annular rings they equal the vertical height of the wheel, and the space between the outward-flaring arms $l'''$ and the free end of the curved segments $l''$ forms the openings through which the water is admitted to the wheel, and these openings are of a capacity to admit water sufficient to properly fill the wheel. This outer portion of the casing is preferably produced in a casting in one piece, and its inner surface is turned in cylinder form, and the upper and under surfaces of its annular rims are turned or otherwise produced with true horizontal surfaces. This outer casing is placed on the upper end of the cylinder, and is fixed thereto, in a concentric position to the axis of the wheel, by means of suitable screws or bolts connecting the flanges or annular rings of the parts.

At H is represented the cap or crown plate of the case, which is of crowning or dome form, being higher in the center than at the edges, and having a diameter equal to the diameter of the casing, and its outer edge portion, $m$, is horizontal, having its under face turned to engage the turned upper face of the casing, to which it is fixed by means of suitable screws, screw-bolts, or otherwise. The rim of this cap at proper intervals is provided with concentric slots, (represented at $m'$,) for a purpose to be hereinafter specified. The upper face of the rim portion of this cap or crown plate is also turned to a true horizontal face. On the central portion of this crown-plate is produced a central collar-like portion having its vertical walls $m''$ and its upper horizontal surface, $m'''$, turned to true surfaces.

At I is represented a tubular bearing portion having its lower end provided with a foot-flange, $n$, having its under surface turned to engage the turned upper surface, $m'''$, of the collar-like portion, to which it is securely fixed by means of suitable screws or bolts. The upper end of this tubular bearing is centrally bored to receive the shaft D of the wheel.

At $n'$ are represented bushings, made of wood or other suitable material, placed within the tubular portion of the bearing, and which are held in position and made adjustable by means of suitable set-screws, $n''$, by which the shaft may be properly centered and supported to revolve therein.

At K is represented a suitable cup-like portion fitted to the upper end of the tubular bearing I, and is fixed in position thereon by suitable clamping-bolts. This cup-like portion is employed to contain lubricants in contact with the shaft, to reduce friction and prevent the parts from cutting.

At L is represented the gate-rim, consisting of an upper annular rim, $o$, and a like lower annular rim, $o'$, connected at proper equal intervals by vertical gates $o''$, in cross-section, of the triangular form, as shown in the drawings. These triangular-formed gates are in number equal to the number of buckets in the wheel, and to the number of curved segments in the outer casing; and their height is such that, in connection with the annular rims, they equal the vertical height of the wheel; and the space between the gates on the periphery of the annular rims is equal to the opening on the inner side of the outer casing, through which the water is admitted to the wheel. This gate-ring is produced with turned outer surfaces, and of proper size to snugly enter in a loose-fitting manner between the outer casing and the wheel, in such a manner as to be capable of a limited oscillatory movement, sufficient to close the induction-openings in the outer casing, through which the water is admitted, to exclude it from the wheel, or to open them to their full capacity. The upper surface of this gate-ring is provided at proper intervals with upward-projecting studs $p$, fitted to enter the concentric slots $m'$, formed in the horizontal outer rim of the crown-plate, in such a manner as to be capable of moving lengthwise in the slots.

At N is represented a horizontal annular rim, having its under face turned to engage the turned upper surface of the horizontal outer rim portion of the crown-plate, immediately over the concentric slots therein, and is fixed to the studs $p$, rising from the gate-rim through the slots by means of suitable screws, $p'$, passed through the rim and screw-threaded into the studs, which serve to fix the parts to each other in a secure manner.

At N' are represented radial arms, having their outer ends connected with the inner edge of the annular rim N, from which point they extend in radial lines toward the center, having their inner ends connected with the base of a vertical annular ring, N'', which is turned to fit snugly on the vertical walls $m''$ of the central collar-like portion in a manner to oscillate thereon. These parts constitute a spider-like portion, which furnishes a central support to the gate-ring, with which its outer rim is connected.

At P is represented a segment fixed to the outer rim, N, of the spider, having a portion of its periphery provided with spur-gear teeth, which engage the teeth of a spur-toothed gear-pinion, P', mounted on a vertical shaft, P'', supported to revolve in bearings in a case, P''', which incloses the spur-pinion, and which is fixed in position to the outer horizontal rim of the crown-plate. The upper end of the shaft P'' is provided with a hand-wheel, $p''$, by means of which the gate-ring may be moved in either direction to open or close the gates to admit more or less water to the wheel. The step $k''$, on which the wheel is supported to revolve, is provided with an axial opening, with which a tube, $s$, is connected, from which it extends in a horizontal direction beyond or outside of the wheel, and is passed upward through the annular rings of the outer rim, and rises nearly to the surface of the water, as at $s'$, at which point it is provided with a turn-down portion, $s''$. This tube is designed to conduct water as a lubricant to the center of the step-bearing, and its turn-down portion is employed to prevent the sediment from settling in the tube. This tube may be employed to conduct oil to the step as a lubricant, in which instance it is extended above the level of the head-water, and is provided with a suitable vessel, as represented at $t$, to contain the oil employed. The upper end of the wheel-shaft is fitted with a clutch-formed coupling, R, with which to connect a shaft-extension.

From the foregoing it will be seen that we produce a wheel in which the curve of the buckets is such as to pass from a vertical line at the periphery of the wheel, where they receive the water, to a horizontal line at the place of issue in the plane of the under face of the wheel in smooth and easy curves, to permit the water to pass through the wheel unbroken, by which better results are obtained than can be from wheels employing angles or abrupt curves, which operate to break the column of water in its passage through the wheel.

By means of the central bearing-support of the gate-ring it is capable of being moved with more ease and with greater certainty, rendering a more efficient device, and by means of a lubricant centrally supplied to the step-support the friction is reduced and the parts rendered more durable.

We claim as our invention—

1. The combination, in a two-rimmed water-wheel having its upper plate curved inward and downward, meeting the periphery of the hub in the plane of the lower face of the wheel, of buckets connecting the rims at their peripheries in vertical lines, their upper edges connecting the under curved face of the upper plate in a curved spiral line in easy curves terminating in the periphery of the hub in the lower plane of the wheel on the side of the hub opposite the connection of the bucket with the rims at their peripheries, substantially as and for the purpose hereinbefore set forth.

2. The herein-described water-wheel, consisting of an upper plate having its under surface concave on radial planes, buckets joining the lower and upper outer rims of the wheel in vertical lines, having their upper edges connected with the under curved surface of the upper plate in smooth, easy curves in a descending spiral line terminating in the lower plane of the wheel on the side of the hub opposite to the bucket-connection with the outer rim, from which connection they curve downward and outward, their lower edges producing the lower outer rim, and their lower ends terminating in the plane of the lower face of the wheel, substantially as and for the purpose hereinbefore set forth.

3. The combination, with the herein-described two-rimmed water-wheel, consisting of the upper plate with curved under surface, the buckets connected to the upper rim and descending in spiral lines and terminating in the lower plane of the wheel on the side of the hub opposite to the bucket-connection with the upper rim, of an outer rim having induction-openings, and a gate-ring provided with induction-openings to correspond with the openings in the outer rim, and fitted to oscillate between the outer rim and the wheel, substantially as and for the purpose set forth.

4. The combination, with the step-support of the wheel, of a tube-connection with the axial center of the step, to conduct a lubricant to the bearing-surface of the support, as and for the purpose hereinbefore set forth.

THEODORE M. FLENNIKEN.
THOMAS W. GRAHAM.

Witnesses to Flenniken:
A. O. BEHEL,
JACOB BEHEL.

Witnesses to Graham:
J. C. LONGUEVILLE,
F. B. CLARKE.